May 30, 1972  L. R. MITCHELL ET AL  3,666,379
TANDEM DIAPHRAGM METERING PUMP FOR CORROSIVE FLUIDS
Filed July 17, 1970
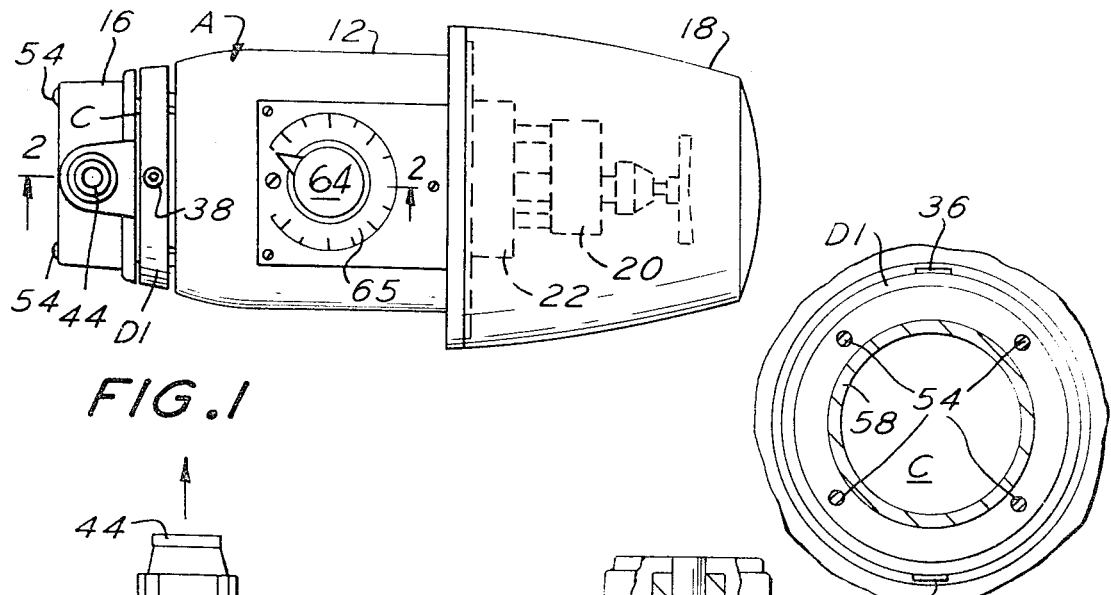
FIG.1
FIG.3
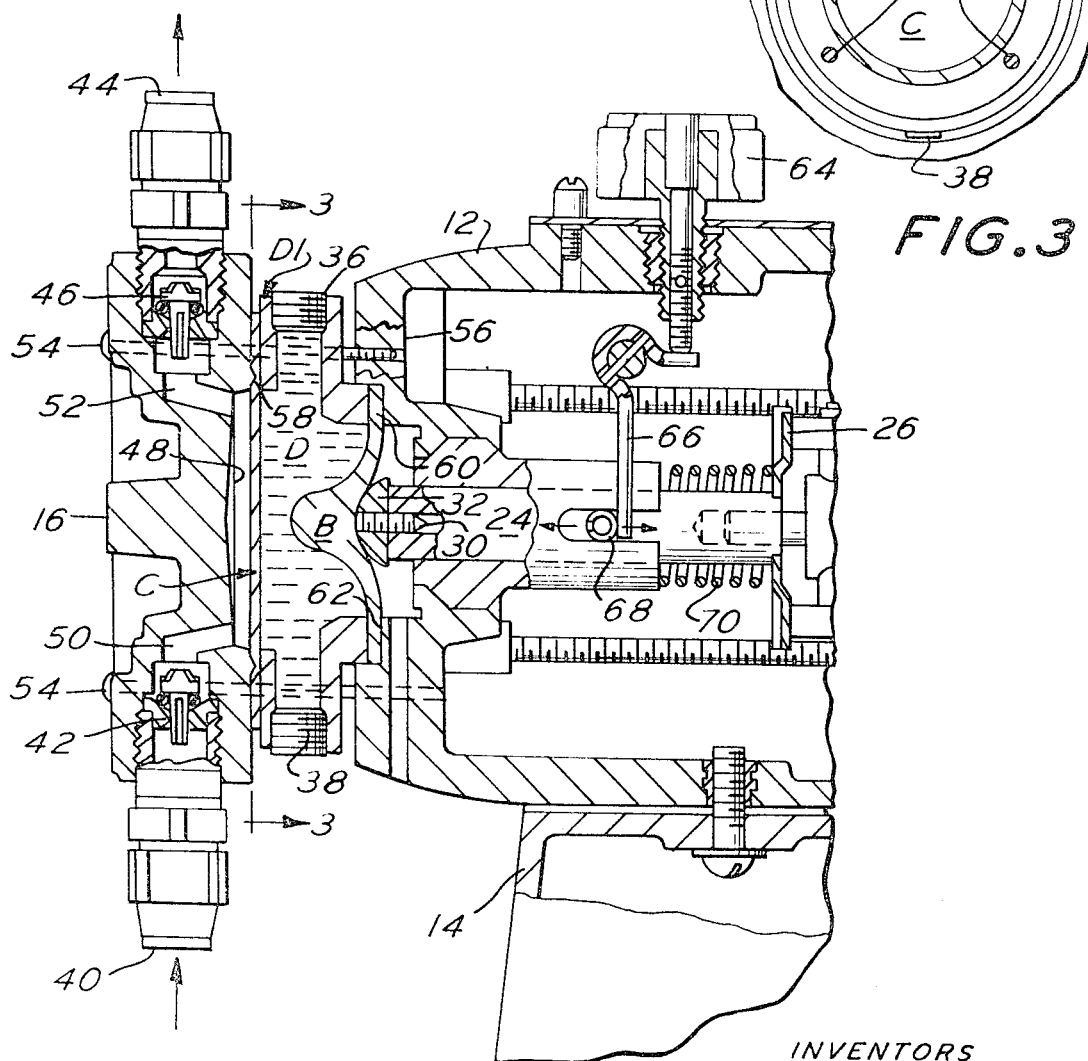
FIG.2
INVENTORS
LAWRENCE R. MITCHELL
WILLIAM C. CONKLING
BY
*Stanley Belker*
ATTORNEY

United States Patent Office 3,666,379
Patented May 30, 1972

3,666,379
TANDEM DIAPHRAGM METERING PUMP FOR CORROSIVE FLUIDS
Lawrence R. Mitchell, Fort Lee, and William C. Conkling, Essex Fells, N.J., assignors to Pennwalt Corporation, Philadelphia, Pa.
Filed July 17, 1970, Ser. No. 55,640
Int. Cl. F04b 43/06, 45/00
U.S. Cl. 417—395
6 Claims

ABSTRACT OF THE DISCLOSURE

A diaphragm type metering pump, especially adapted for handling corrosive fluids, incorporates a slack resilient diaphragm disk made of a chemically inert polymer, such as polytetrafluorethylene, which is spaced from the primary positive displacement diaphragm. A liquid medium fills the space between the two diaphragms and transmits reciprocable motion of the primary diaphragm to the slack secondary diaphragm which is in operative contact with the fluid being pumped.

---

This invention relates to diaphragm pumps and more particularly relates to positive displacement type diaphragm pumps which are especially adapted for handling corrosive liquids.

In conventional positive displacement diaphragm pumps, a reciprocating drive member is directly coupled to the center portion of a diaphragm whose peripheral edges are retained within the pump casing, the chief advantage being the avoidance of packings and seals exposed to the liquid being pumped. Although elimination of packings and seals is an important asset during handling of hazardous or toxic liquids, it frequently occurs that the elastomeric diaphragm itself may be subject to attack by the corrosive or solvent of the liquid being pumped.

The usual positive displacement diaphragm is of metal, fabric and elastomeric design, carefully constructed for substantial displacement of fluid under positive discharge pressure on the forward stroke and induction of fluid into the space evacuated on the return stroke at approximately atmospheric or negative gauge pressure. For example, a free diameter of 1⅜ inch may be reciprocated two or three tenths of an inch while developing a discharge pressure of 100 p.s.i. A thrust of approximately 100 pounds must thus be transmitted to the unclamped area of this diaphragm without disproportionate stretching thereof. On the return stroke, the construction must resist deflection of the unclamped area in the forward direction to avoid subtraction from the displacement that would result. Furthermore, any variatioin in consistent shape of the diaphragm in the free area under varying suction and discharge conditions results in a variation in displacement of such a diaphragm which becomes more pronounced as the ratio of stroke length to clamped diameter decreases. Thus, it is desirable to have a relatively high ratio. Further, the smaller the diameter, the lower is the force on the driving mechanism.

In the past, attempts have been made to utilize chemically inert materials, such as polytetrafluorethylene (PTFE), as positive displacement diaphragms. However, prior endeavors to bond the tetrafluorethylene polymers to an elastomeric face have failed in the case of positive displacement diaphragms because PTFE is not and does not behave as an elastomer coupled with the fact that its inert characteristics and slick surface make adhesion difficult especially with repeated flexure of relatively long stroke. Separation of the polytetrafluorethylene facing from the surface of the elastomeric diaphragm has occurred within a relatively short period of time. While the use of a polytetrafluorethylene disk has been contemplated as a primary diaphragm, thin sections thereof are substantially porous in nature, and comparatively thick sections do not offer sufficient resiliency and elastomeric qualities to act as the main driving disk even in the relatively short stroke of a direct displacement diaphragm pump.

It is therefore an object of this invention to provide a diaphragm type pump for handling corrosive liquids and gases.

Another object of this invention is to provide a diaphragm type pump in which a primary elastomeric diaphragm transmits reciprocating motion of the drive through a liquid medium to a secondary or tandem diaphragm of chemically resistant material in contact with the corrosive liquid or gas being pumped.

Still another object of this invention is to provide a positive displacement type diaphragm pump which employs an inert slack diaphragm for pumping the corrosive liquid in tandem with and coupled to the elastomeric driving diaphragm through a fluid transmitting medium.

Other objects of this invention are to provide an improved device of the character described which is easily and economically produced, sturdy in construction, and both highly efficient and effective in operation.

With the above and related objects in view, this invention consists of the details of construction and combination of parts as will be more fully understood from the following detailed description when read in conjunction with the accompanying drawing in which:

FIG. 1 is a top plan view of a diaphragm type pump embodying this invention;

FIG. 2 is a sectional view taken along lines 2—2 of FIG. 1; and

FIG. 3 is a sectional view taken along lines 3—3 of FIG. 2.

Referring now in greater detail to the drawings in which similar reference characters refer to similar parts, we show a positive displacement diaphragm pump comprising a housing, generally designated as A, an elastomeric primary diaphragm B reciprocably driven longitudinally in the housing, and a chemically inert secondary diaphragm C actuated in tandem with the primary diaphragm through an intermediate liquid transmitting medium D. The diaphragm C is in operative contact with the fluid being pumped and acts to draw the fluid into and discharge the fluid from the pumping chamber.

As illustrated, the housing A is of generally cylindrical configuration and includes a body portion 12 supported on a suitable base 14, a head 16 and a motor cover 18. The drive for the primary diaphragm B and the housing A may be substantially similar to the diaphragm pump unit shown in prior U.S. Pat. No. 3,164,024. For example, rotary motion of motor 20 operating through gear reducer 22 is translated into longitudinal reciprocable motion of drive shaft 24 by way of cam plate 26. However, it is to be understood that the drive mechanism per se does not form a basic part of the instant invention, except to the extent of its direct coupling to the primary diaphragm B which is positively displaced by the longitudinal reciprocable motion of the shaft 24, and any suitable reciprocating drive may be employed.

The primary diaphragm B is a conventional flexible elastomeric disk which is capable of repeated flexures over a long period of time. For example the diaphragm B may be a chlorinated sulfonated polyethylene elastomer, such as 60 to 70 durometer "Hypalon," molded about a centrally located brass stud 30 and backed by a suitable fabric, such as nylon. The brass stud 30 is threaded into a tapped bore in the shaft 24 with a half round backing button 32 interposed between the rear surface of the diaphragm B and the forward end of the shaft.

The secondary diaphragm C may utilize a polytetrafluoroethylene disk nominally .015 inch thick having a tensile strength approximately 4000 p.s.i. and elongation of 300%. One face of the PTFE disk is etched and bonded to suitable resilient backing, such as a Hypalon disk having a durometer in the range of 50 to 60. Other materials which are contemplated for use as chemically resistant slack diaphragms in the present invention are fluorinated polymers and copolymers, such as "Kynar," a sintered polyvinylidene fluoride made by Pennwalt Corporation of Philadelphia, Pa. The diaphragm C is retained in position solely by its peripheral edges within the housing and operates as a slack diaphragm. The diaphragm B is also retained by its peripheral edges within the housing but in addition is directly coupled to the drive shaft 24. The two diaphragms B and C are held in spaced disposition from each other by an adapter D1 which acts as a container for the pressure transmitting liquid D, for example a suitable silicone oil. The silicone oil transmitting medium is charged into the adapter D through filler tube 36 so as to completely occupy the space between the two diaphragms. A drain plug 38 is also provided to permit oil removal.

The pump also includes a conventional fluid inlet port 40 with associated check valve 42 and a discharge port 44 with associated check valve 46. The head 16 has a recess 48 which acts as a pumping chamber in cooperation with the slack diaphragm C. Passageways 50 and 52 extending into the pumping chamber 48 are respectively coupled with the inlet and outlet ports 40 and 44 through the associated check valves 42 and 46. The head 16 is assembled upon the body portion 12 by passing screws 54 through corresponding circumferentially spaced aligned holes in the head, in the margin of the slack diaphragm C, and in the adapter D1, into threaded engagement with respective tapped holes 56 in the front face of the body. A circular ridge 58 on the inner face of the head 16 bears against the margin of the slack diaphragm C and acts as a seal. The adapter D1 has a circular shoulder 60 which sandwiches the periphery of the primary diaphragm B against a complementary recess 62 in the front face of the body portion 12.

As may be evident from the foregoing description and particularly from prior U.S. Pat. No. 3,164,024, knob 64 is utilized to adjust the stroke or movement of plunger shaft 24 by means of hinged plate 66 which abuts against shaft pin 68. Plate 66 prevents full return of plunger shaft 24 under the urging of spring 70. The knurled knob 64 includes a stroke adjusting dial 65 which is graduated in terms of remaining effective stroke or of pump discharge and is arranged such that one full turn of the knob covers a range of from zero to 100% pump discharge capacity. The adapter D1 is filled with the silicone oil D when the knob 64 is at minimum stroke, allowing trapped air to rise before installing the plug within the filler tube 36.

Thus, the diaphragm C which is in direct contact with the fluid being pumped is in tandem relationship with the driving diaphragm B. The pressure exerted by the driving diaphragm B is transmitted through the oil D to the slack diaphragm C whose chemically resistant face, for example, PTFE, operates on the corrosive product.

In the present invention, not only is the concentrated thrust of diaphragm B translated into a uniformly applied hydraulic thrust on diaphragm C, but this thrust is inherently balanced out across diaphragm C by the pressure of the pumped fluid, except of course for the minor differential pressure required to overcome the component of resistance of the diaphragm to "dishing." Furthermore, by the use of a tandem diaphragm, the clamped diameter of member C may be much larger than B and to any extent necessary for minimizing C's deflection, thereby minimizing internal stressing due to cyclic deflection. Typically, the clamped diameter of diaphragm C may be 2 inches where the clamped diameter of diaphragm B is 1⅜ inches, thus including an effective area of approximately twice that of B. Accordingly, the average and maximum deflections are approximately halved. In filling the chamber D with coupling fluid, the loading technique is performed so that the diaphragm C is permitted to deflect on each side of its neutral position. Therefore, both stress relief as a result of the large diameter tandem diaphragm together with the substantially equalized and uniform hydraulic coupling lends long life to diaphragm C while protection from corrosive fluids contribute to long life for diaphragm B.

Although this invention has been described in considerable detail, such description is intended as being illustrative rather than limiting since the invention may be variously embodied, and the scope of the invention is to be determined as claimed.

What is claimed is:

1. A diaphragm type metering pump for handling corrosive liquids comprising
   a casing,
   a first diaphragm constituting a flexible elastomeric disk peripherally supported within said casing,
   driving means coupled to the center portion of said first diaphragm for effecting reciprocation thereof,
   a second diaphragm constituting a slack resilient disk of corrosive resistant material supported solely at the peripheral edges thereof within said casing and in longitudinally spaced disposition from said first diaphragm,
   a liquid medium filling the space intermediate said first and second diaphragms, and
   a pumping chamber adjacent said second diaphragm and including an inlet port and a discharge port in communication with said pumping chamber,
   the ratio of unsupported area of said second diaphragm to that of said first diaphragm being greater than substantially 2 to 1 whereby said second diaphragm will incur minimal stress at reduced deflection while said first diaphragm is highly stressed at relatively long stroke conditions.

2. The invention of claim 1 wherein said second diaphragm is comprised of a fluorinated polymer laminated to the face of the disk in contact with the corrosive material being pumped.

3. The invention of claim 2 wherein said fluorinated polymer is polytetrafluoroethylene.

4. The invention of claim 2 wherein the fluorinated polymer is included upon a chlorinated sulfonated polyethylene backing.

5. The invention of claim 1 wherein the unsupported area of said second diaphragm is sufficiently large to minimize deflection thereof so as to minimize internal stressing due to cyclic deflection.

6. The invention of claim 1 wherein the liquid medium preloads said second diaphragm in the central position of said first diaphragm thereby effecting a resilient deflection in said second diaphragm on each side of the neutral position thereof so as to equalize and provide uniform hydraulic coupling.

References Cited
UNITED STATES PATENTS

| | | | |
|---|---|---|---|
| 2,920,572 | 1/1960 | Schaurte | 417—389 |
| 3,070,030 | 12/1962 | Mashinter | 417—395 X |
| 2,400,099 | 5/1946 | Brubaker et al. | 92—103 SD |
| 2,867,241 | 1/1959 | Fitzharris | 92—103 SD |

ROBEDT M. WALKER, Primary Examiner